Sept. 13, 1960 T. J. GROSS 2,952,076
BOX GAUGE
Filed Sept. 10, 1957
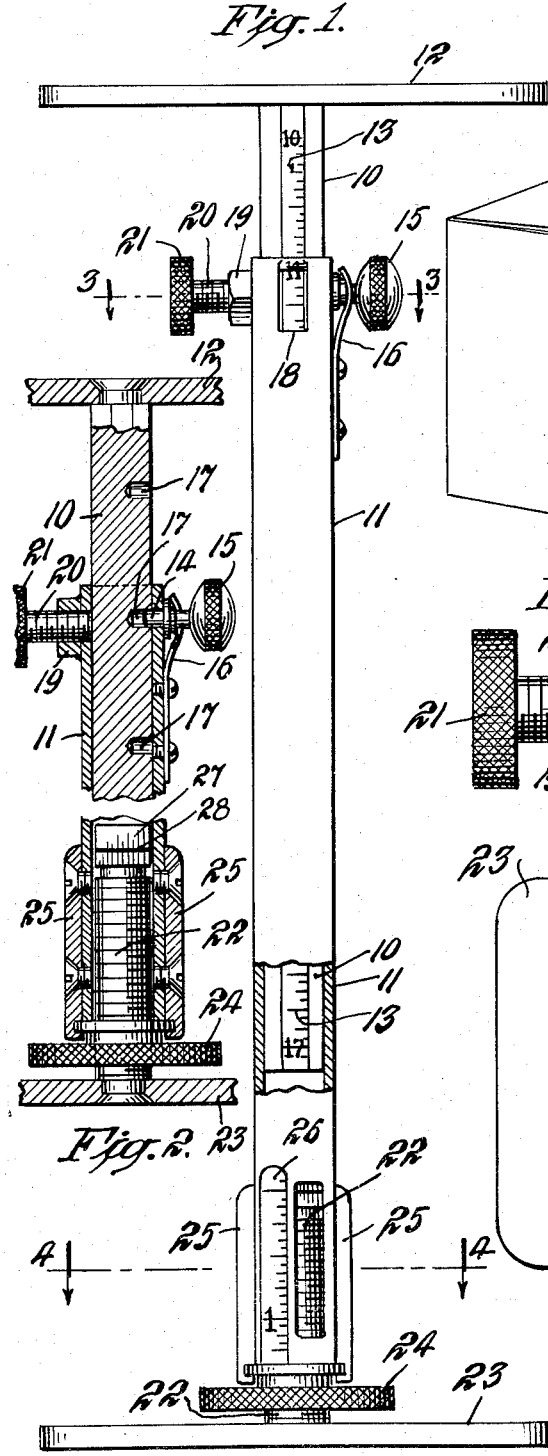
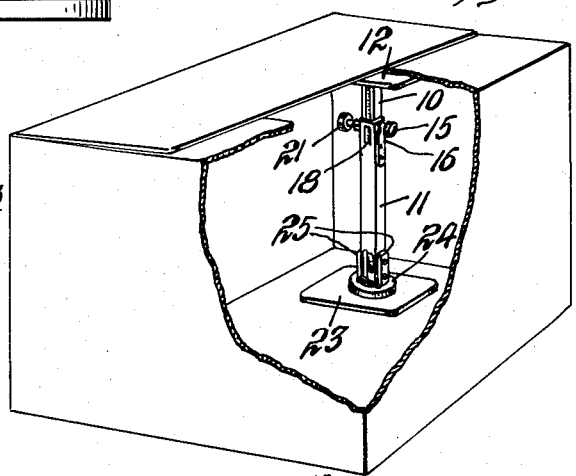
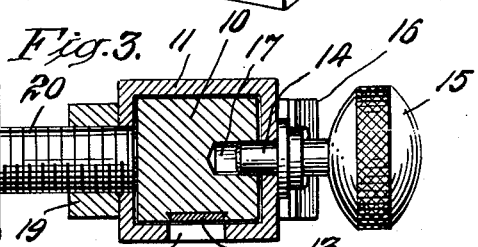
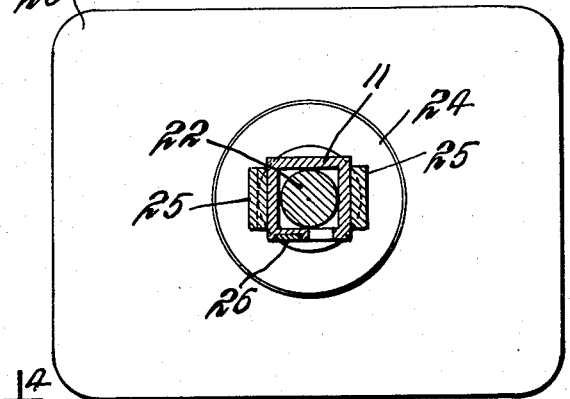
INVENTOR.
THEODORE J. GROSS
BY
Charles P. Bauer
ATTORNEY

United States Patent Office 2,952,076
Patented Sept. 13, 1960

2,952,076

BOX GAUGE

Theodore J. Gross, White Plains, N.Y., assignor to Union Bag-Camp Paper Corporation, New York, N.Y., a corporation of Virginia Filed Sept. 10, 1957, Ser. No. 683,038

2 Claims. (Cl. 33—165)

This invention relates to improvements in box gauges. More particularly it pertains to an improved gauge adapted for measuring the inside dimensions of boxes.

To the box manufacturer, customer complaints of incorrect size are not uncommon. Such complaints are generally difficult to deal with because the discrepancy is usually so small that, with different methods of measurement, honest differences of opinion can exist. The inventor believes that the true inside dimension of any box is the shortest distance between opposite faces when the box is set up. The box gauge of the present invention can be placed inside an empty set-up box and gives direct measurements of inside dimensions, accurate to within a fraction of an inch.

An object of the invention is to provide a device of the type stated which is simple in design, rugged in construction, economical to manufacture, and can be easily transported to any location where boxes are to be used.

Other objects of the invention will in part be obvious and will in part appear hereinafter.

The invention accordingly comprises the features of construction, combination of elements and arrangements of parts, which will be exemplified in the construction hereinafter set forth and the scope of the invention will be indicated in the claims.

For a fuller understanding of the nature and objects of the invention, reference should be had to the following detailed description taken in connection with the accompanying drawing, in which:

Figure 1 is a plan view of the gauge of the present invention;

Figure 2 is a sectional view of the gauge with portions cut away;

Figure 3 is a section taken along the lines 3—3 of Figure 1;

Figure 4 is a section taken along the lines 4—4 of Figure 1;

Figure 5 is a perspective view of a box with the gauge inside in position to measure the depth of the box.

Referring more particularly to the drawings, there is shown in Figure 1 a telescoping rod 10 and tube 11, each square in cross section. Secured to one end of the rod 10 is a flat plate 12. The rod 10 is marked with a scale reading 13. The tube 11 is fitted with an automatic pin locking device, consisting of a pin 14, a knurled knob 15 and a spring plate 16 secured to the tube. The pin 14 extends through the tube 11 and into holes 17 drilled in the rod 10 at even increments of one inch. Thus the rod can be withdrawn from the tube for any desired distance merely by lifting the knob 15. When the desired inch mark is reached the pin is released and the rod is automatically locked in place at that point. A small window 18 in the tube shows the inch setting at which the rod is locked. In addition to the automatic locking device there is a manual lock which permits locking the rod at any desired point on the scale. This manual lock consists of a threaded nut 19 secured to the tube 11, a screw 20 and a knurled knob 21. This manual lock permits locking of the rod in any position by the pressure of the screw 20 against the face of the rod.

At the opposite end of the tube 11 is an extension adjustment consisting of a short threaded rod 22, to which is secured a flat plate 23 similar to the plate 12 at the other end, a knurled wheel 24 threaded to the rod 22, and a pair of plates 25 secured to the tube 11 and holding the knurled wheel 24 and rod 22 in position at the end of the tube. The end of the rod 22 within the tube has affixed thereto a square block 27 which prevents rotation of the rod 22 and the plate 23 and thereby maintains the extension scale in the proper position to be viewed through the window as shown in Figure 1. On the block 27 is an index line 28 which cooperates with and moves along the scale plate 26 as the wheel 24 is rotated. The wheel 24, when rotated, causes the rod 22 to emerge from the tube and move through a distance of one inch. The amount of movement may be quickly and easily read to 1/16" from the scale plate 26 placed at the end of the tube.

To cover the wide range of box sizes normally encountered, it has been found advantageous to use several units of varying tube and rod lengths. In practice, it has been found that a set of three units will cover the great bulk of size variations.

In using the instrument to measure the length or width of a box, the box is first set up, that is, the bottom flaps are folded in place and the top flaps left open. Depending upon the size of the box, the proper unit is selected and the telescoping rod withdrawn to the largest inch mark which will permit insertion of the instrument into the box with the extension set at zero. The rod will lock automatically at this point. Placing the instrument in the box in the direction to be measured and with the flat plate at the extended end pressed firmly against one wall, the knurled wheel of the extension is then rotated until the flat plate at that end makes firm contact with the opposite wall. It will be apparent that the instrument can be held and adjusted with one hand. The exact inside dimension is then read directly from the instrument by adding the number of inches shown in the small window at the lock to the fractional part of an inch shown on the vernier. For example, if the dimension of the box is between 12" and 13", the rod is withdrawn until the figure 12 appears in the window. It is then placed in the box as described above and the knurled wheel rotated until both metal plates make contact with the end walls of the box. If, at that point, the vernier reads 3/8", the exact inside length of the box is 12 3/8". Width measurements are made in exactly the same manner.

In measuring the depth dimension, the instrument is operated in the same manner except that it is placed in an upright position on one of the bottom inside flaps of the box. The opposite top inside flap and one outer flap of this box are then folded into normal position. The extension may then be operated with one hand by reaching through the opening left by the other two top flaps which are not folded in place. It has been found that a simple way to assure correct extension setting in this position is to place a ruler or straight edge across the folded down top flap, and, bearing down with firm pressure, extend the extension with the other hand until contact is made. (See Figure 5.)

The flat plates 12 and 23 as shown in Fig. 2 at each end of the instrument are important and serve a very useful purpose. When these plates are pressed flush against the opposite walls of the box, the rods will project at right angles from the walls and span the shortest distance. This insures an accurate measurement between the walls and prevents an incorrect measurement which might result from holding the rods at an angle.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A box gauge for measuring the inside dimensions of a box comprising a tube, a rod telescoping into said tube adapted for extension in predetermined units, locking means fitted to one end of said tube for locking said tube to said rod, a measuring scale showing the units to which the rod is extended, said scale marked on said rod at said end adjacent to said locking means, a threaded movable member at the end of said tube opposite to said locking means provided with an extension adjustment, a wheel threaded to said movable member for extending said movable member by fractions of a unit, means on opposite sides of said tube engaging said wheel to prevent longitudinal displacement of said wheel with respect to said tube, said tube being provided with an aperture located between said means preventing longitudinal displacement exposing the threads of said movable member, said tube being provided with an extension scale along side said aperture and between said means preventing longitudinal displacement whereby the screw threads on the inside of said tube may be viewed against the extension scale along side said aperture, said extension scale showing the fractions of a unit to which said movable member is extended and flat plates mounted at opposite ends of said rod and said movable member for contact with opposite walls of the box, the distance between the plates being read directly on the scales.

2. A box gauge for measuring the inside dimensions of a box comprising a tube, a rod telescoping into such tube and adapted to be extended for predetermined units, locking means fitted to one end of said tube for locking said tube to said rod consisting of a pin extending transversely through said tube to bear in locking engagement with said rod, spring means urging said pin in locking engagement and knob disengaging means for retracting said locking means from locking position, a measuring scale showing the units to which the rod is extended, said scale marked on said rod at said end adjacent to said locking means, a threaded movable member at the end of said tube opposite to said locking means provided with an extension adjustment, a wheel threaded to said movable member for extending said movable member by fractions of a unit, means on opposite sides of said tube engaging said wheel to prevent longitudinal displacement of said wheel with respect to said tube, said tube being provided with an aperture located between said means preventing longitudinal displacement exposing the threads of said movable member, said tube being provided with an extension scale along side said aperture and between said means preventing longitudinal displacement whereby the screw threads on the inside of said tube may be viewed against the extension scale along side said aperture, said extension scale showing the fractions of a unit to which said movable member is extended, flat plates mounted at opposite ends of said rod and said movable member for contact with opposite walls of the box, the distance between the plates being read directly on the scales.

References Cited in the file of this patent

UNITED STATES PATENTS

| | | |
|---|---|---|
| 339,410 | Heydrich | Apr. 6, 1886 |
| 367,473 | Tickell | Aug. 2, 1887 |
| 909,068 | Denman et al. | Jan. 5, 1909 |
| 1,583,585 | Emery | May 4, 1926 |
| 1,596,618 | Morrill | Aug. 17, 1926 |
| 1,668,208 | Jenkins | May 1, 1928 |
| 2,512,042 | Stern | June 20, 1950 |
| 2,603,877 | Gentz | July 22, 1952 |
| 2,822,621 | Barrett | Feb. 11, 1958 |